United States Patent [19]

Kimball et al.

[11] Patent Number: 5,661,696
[45] Date of Patent: Aug. 26, 1997

[54] METHODS AND APPARATUS FOR DETERMINING ERROR IN FORMATION PARAMETER DETERMINATIONS

[75] Inventors: Christopher K. Kimball, West Redding, Conn.; David J. Scheibner, Tokyo, Japan

[73] Assignee: Schlumberger Technology Corporation, Ridgefield, Conn.

[21] Appl. No.: 514,412

[22] Filed: Aug. 11, 1995

Related U.S. Application Data

[63] Continuation-in-part of Ser. No. 322,885, Oct. 13, 1994, Pat. No. 5,587,966.
[51] Int. Cl.$^6$ ................................ G01V 1/40; G01V 1/28
[52] U.S. Cl. ............................ 367/31; 367/26; 367/73; 364/421
[58] Field of Search ............................... 367/25, 261, 31, 367/73; 364/422, 812.1, 552, 937.5

[56] References Cited

U.S. PATENT DOCUMENTS

| | | | |
|---|---|---|---|
| 4,543,648 | 9/1985 | Hsu | 367/33 |
| 4,698,793 | 10/1987 | Wu | 367/32 |
| 4,839,869 | 6/1989 | Corcoran | 367/53 |
| 4,888,740 | 12/1989 | Brie et al. | 367/30 |
| 5,278,804 | 1/1994 | Kimball | 367/32 |

*Primary Examiner*—Nelson Moskowitz
*Attorney, Agent, or Firm*—David P. Gordon; Brigitte L. Jeffery; Keith G. W. Smith

[57] ABSTRACT

Methods and apparatus for generating an error bar (variance) log for a formation parameter are disclosed. According to the method, acoustic waveforms are detected at a plurality (M) of detectors which are a function of a source signal which has interacted with the formation and noise, and the detected waveforms are sampled and processed in order to obtain a semblance or a normalized mean square error. Using the semblance or the NMSE which is related to the semblance, a signal to noise ratio $2E/N_0$ can be found by recognizing that the semblance function has a non-central beta distribution whose mean is a function of the signal to noise ratio $2E/N_0$, the time-bandwidth product N, and M. The signal to noise ratio is then used to find the Cramer-Rao lower bound which is taken as an estimate of the variance. An error bar log is formed by repeating these steps at a plurality of locations along the borehole. The method of the invention can be used in conjunction with both attenuating and non-attenuating waves. The apparatus of the invention relates closely to the method.

26 Claims, 7 Drawing Sheets

METHODS AND APPARATUS FOR DETERMINING ERROR IN FORMATION PARAMETER DETERMINATIONS

This is a continuation-in-part of co-owned U.S. Ser. No. 08/322,885, filed Oct. 13, 1994, now U.S. Pat. No. 5,587,966 which is hereby incorporated by reference in its entirety herein.

BACKGROUND OF THE INVENTION

1. Field of the Invention

This invention relates generally to the logging of earth formations. More particularly, this invention relates to techniques for quantifying errors associated with the determination of values for formation parameters via sonic logging. The invention has particular application to sonic well logging techniques where the slowness of a formation is determined via processing of semblances of sonic wave information.

2. State of the Art

Sonic well logs are typically derived from tools suspended in a mud-filled borehole by a cable. The tools typically include a sonic source (transmitter) and a plurality (M) of receivers which are spaced apart by several inches or feet. Typically, a sonic signal is transmitted from one longitudinal end of the tool and received at the other, and measurements are made every few inches as the tool is slowly drawn up the borehole. The sonic signal from the transmitter or source enters the formation adjacent the borehole, and the arrival times and other characteristics of the received responses are used to find formation parameters.

One sonic log of the art which has proved to be useful is the slowness-time coherence (STC) log. Details of the techniques utilized in producing an STC log are described in U.S. Pat. No. 4,594,691 to Kimball et al., as well as in Kimball, et al., "Semblance Processing of Borehole Acoustic Array Data"; *Geophysics*, Vol. 49, No. 3, (March 1984) pp. 274–281 which are hereby incorporated by reference in their entireties herein. Briefly, the slowness-time coherence log utilizes the compressional, shear, and Stoneley waves detected by the receivers. A set of time windows is applied to the received waveforms with the window positions determined by two parameters: the assumed arrival time at the first receiver, and an assumed slowness. For a range of values of arrival time and slowness, a scalar semblance is computed for the windowed waveform segments by backpropagating and stacking the waveforms and taking the normalized ratio of the stacked energies to the unstacked energies. The semblance may be plotted as a contour plot with slowness and arrival times as axes, with maximum semblance values indicating the determined formation slowness value. In addition, local maxima of the semblance function are identified by a peak-finding algorithm, and the corresponding slowness values may be plotted as gray-scale marks on a graph whose axes are slowness and borehole depth, or processed further to yield continuous, labelled results. The intensity of the gray-scale marks is proportional to the height of the semblance peak.

As indicated in the aforementioned article and U.S. Pat. No. 4,594,691 to Kimball et al., the same backpropagation and stacking techniques are used regardless of whether the wave being analyzed is a P-wave, S-wave, or a Stoneley wave; i.e., regardless of whether the wave is non-dispersive or dispersive. However, while such backpropagation and stacking techniques may be optimal for non-dispersive waves, they are not optimal for dispersive waves such as flexural and Stoneley waves. In response to this problem, at least two different approaches have been utilized.

A first approach known as "bias-corrected STC" which is currently commercial, is disclosed in A. R. Harrison, et al., "Acquisition and Analysis of Sonic Waveforms from a Borehole Monopole and Dipole Source . . . ", SPE 20557, pp. 267–282 (Society of Petroleum Engineers, Inc. 1990) and U.S. Pat. No. 5,229,939 which are both hereby incorporated by reference herein in their entireties, is to process the flexural mode waveforms as before, but to correct the non-dispersive processing results by a factor relating to the measured slowness; i.e., to post-process the STC results. In particular, correction values are obtained by processing model waveforms with the STC techniques and comparing the measured slowness with the formation shear slowness of the model. The model waveforms assume a particular source and are bandlimited to a prescribed band (typically 1 to 3 KHz) before STC processing. Tables of slowness corrections are designated by a particular source and processing bandwidth, and contain corrections as percentage-of-measured-value factors functions of measured value and hole diameter. The percentage correction required increases with hole diameter and is a function of formation slowness, and ranges from less than one percent to as much as fifteen percent. This approach has the drawback that the waveform spectra often disagree with those of the model which causes the pre-calculated correction to be in error, leading to an error in the measured slowness. A second drawback of the bias-corrected STC approach is that the analysis band may exclude the majority of the flexural mode energy even though it reduces sensitivity to environmental parameters.

A second approach known as "QSTC" (also now known as "dispersive STC" or "DSTC"), which is also currently commercial, is described in U.S. Pat. No. 5,278,805 which is hereby incorporated by reference herein in its entirety. In QSTC, detected signals resulting from flexural waves are Fourier transformed in a specified frequency band, and the Fourier transformed signals are backpropagated according to equations using different dispersion curves. The backpropagated signals are then stacked, and semblances are found in order to choose the dispersion curve of maximum semblance from which can be found the shear slowness of the formation. According to preferred aspects of the QSTC processing, prior to Fourier transforming, the signals are windowed according to a previous estimate of slowness, where the time position of the window is found from STC or by maximizing either energy or semblance as a function of time for a predefined slowness. The reduced set of data in the window are then extracted for Fourier transformation, and prior to backpropagation, are corrected for the window slowness estimate to prepare them for backpropagation and stacking.

While STC, bias-corrected STC, and QSTC logs all provide valuable information, they are subject to different types of error. For example, as described above, STC processing does not account for, and hence is not optimal for dispersive waves such as flexural waves. In fact, because processing may occur in a frequency band near the low frequency limit, the signal to noise (S/N) ratio may be low, as little energy propagates in that band. Bias-corrected STC, while attempting to account for dispersion, is subject to error because the waveform spectra often disagree with the model, and because the model waveforms are bandlimited to a particular prescribed band in which there may be limited flexural mode energy. Furthermore, bias-corrected STC and QSTC are both subject to errors in the processing of a dispersive wave which arise from errors in the waveforms (i.e., S/N error) as well as errors in formation and borehole parameters (e.g., hole diameter) required in the processing of the dispersive wave information.

In order to reduce the error in the STC-type logs, in a first embodiment of the parent application hereto, the flexural waves are processed in a frequency band having a center frequency which is a function of the shear slowness, and a product of the shear slowness and the borehole diameter. The bandwidth of the filter is normalized by scaling the bandwidth to a specified fraction of the center frequency, while the window length used in the STC-type processing is likewise normalized to scale with the center frequency. According to a second embodiment of the parent application, the processing band can be chosen by obtaining the error of a plurality of formation and/or borehole parameters as a function of frequency, obtaining the signal to noise ratio of the flexural wave signal as a function of frequency, finding total error of different frequency bands as a function of frequency, and choosing a frequency band of minimum total error. Again, once the frequency band is identified, the bandwidth of the filter is normalized by scaling the bandwidth to a specified fraction of the center frequency, and the window length used in the STC-type processing is likewise normalized to scale with the center frequency.

While the parent application hereto is effective in finding an optimal frequency band for the processing of sonic data in the STC-type logs in order to reduce error in the slowness measurements, there is presently no effective manner of determining the variance of the slowness measurements obtained. While the semblance determination is currently used as a quality indicator of the STC-type processing, semblance only indicates quantitatively how well the waveforms stack, but not the variance of the slowness measurement itself. To appreciate this, a case where processing having the same bandwidth and window duration is applied to two sets of waveform data can be considered, where the second set of data has its energy concentrated at twice the frequency of the first set of data. If the signal to noise ratios of both sets of data are the same, the mean semblance values on the two sets of data will be the same. However, the variance on the first set of data will be four times that of the second set of data because of the increased slowness resolution of the higher frequency data. Thus, semblance indicates the slowness variance only if the frequency content of the signals does not change; and also, as can be shown, only if the number of receivers, the length of the time window, and the bandwidth of the data remains the same.

Another prior art technique for measuring the variance of the slowness measurement has been to divide the received waveform into a first window where no signal is expected and a second window where the signal is expected. The signal energy in the first window is taken as noise, while the signal energy in the second window is taken as a function of the true signal and noise. Using the signal energies in both windows, a signal to noise ratio (S/N) is derived, which serves as a quality indicator. This prior art technique suffers from the difficulty of choosing the position of the windows; and if any signal is found in the noise window, the resulting calculations will be unreliable. In addition, because the first and second windows are artificially chosen, they will not correspond to the window in which the slowness is being calculated. Further, the measured signal to noise ratio S/N does not directly indicate slowness variance.

SUMMARY OF THE INVENTION

It is therefore an object of the invention to provide methods for finding the variance of a determination of a formation property.

It is another object of the invention to obtain variances of determinations of formation properties of which semblances are obtained.

It is a further object of the invention to obtain variance determinations of formation slownesses obtained by logging a formation with a sonic logging tool.

It is an additional object of the invention to obtain variance determinations of formation shear slownesses.

A further object of the invention is to provide an error bar log of formation property values.

A further object of the invention is to provide an error bar log of slowness which can be used in conjunction with a formation slowness log.

Another object of the invention is to provide a signal to noise determination relating to the determination of a formation parameter.

An additional object of the invention is to relate a signal to noise ratio to the semblance in a window of interest without additional information, and to derive an estimate of variance of the formation slowness from the signal to noise ratio.

In accord with the objects of the invention, an error bar (variance) for a formation parameter is generated by: detecting acoustic waveforms at a plurality (M) of detectors which are a function of a source signal which has interacted with the formation and noise; sampling and processing the waveforms to obtain a semblance; finding a signal to noise ratio ($2E/N_0$) by relating the semblance to a function of M, the time-bandwidth product (N), and the signal to noise ratio; and using the signal to noise ratio to estimate a Cramer-Rao lower bound which is taken as an estimate of the variance. An error bar log is formed by repeating these steps at a plurality of locations along the borehole. The method of generating the error bar relies on the recognition that the semblance function has a non-central beta distribution whose mean is a function of the signal to noise ratio $2E/N_0$, the number of detectors M, and the time-bandwidth product N. In addition, the method relies on a determination that the Cramer-Rao lower bound which can be derived from the noise $2E/N_0$ closely approximates the standard deviation of the shear slowness of the formation.

In accord with the invention, the method of generating an error bar can be used both for attenuating waves (e.g., Stoneley) as well as non-attenuating waves (e.g., flexural, s-waves, p-waves). However, in order to obtain the most accurate semblance and slowness determination, the method of calculating semblance (and hence signal to noise ratio) is chosen depending upon the type of waves being processed. Thus, where dispersive waves (e.g., flexural, Stoneley) are processed, the methods of the parent application hereto are utilized in order to obtain the semblance.

Additional objects and advantages of the invention will become apparent to those skilled in the art upon reference to the detailed description taken in conjunction with the provided figures.

BRIEF DESCRIPTION OF THE DRAWINGS

FIG. 3b is plot of simulated noise-free waveforms received at a plurality of simulated receivers as a result of the generated signal of FIG. 3a.

DETAILED DESCRIPTION OF THE PREFERRED EMBODIMENT

Figure 1:
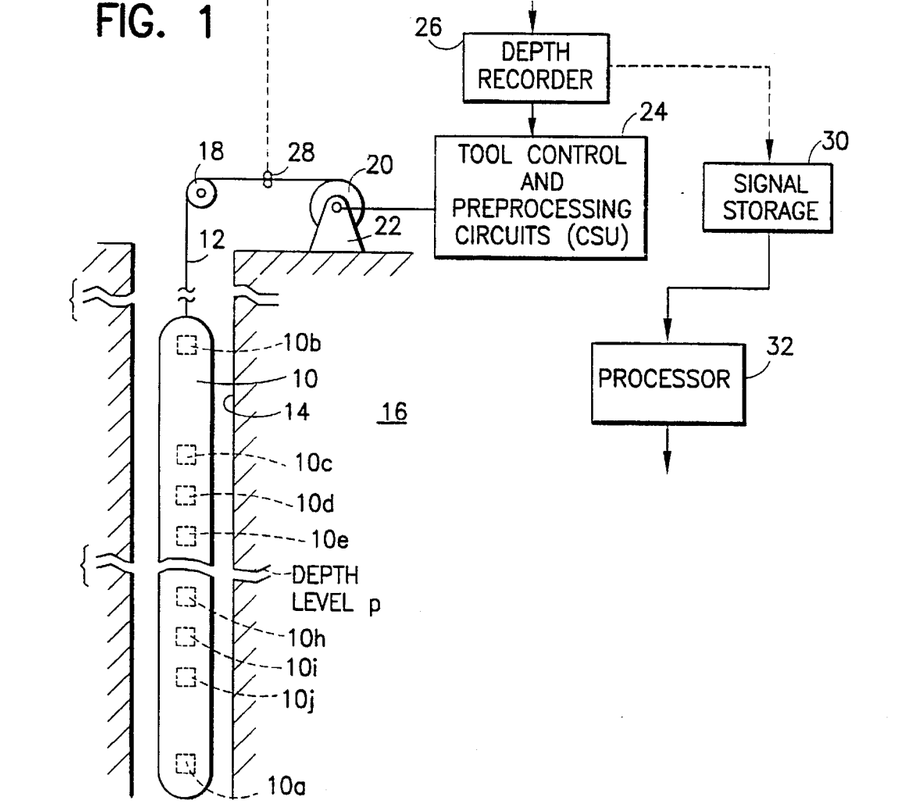
FIG. 1 is an overall schematic illustration of a logging system making use of an exemplary embodiment of the invention.

Referring to FIG. 1, an overall schematic illustration of a well logging system making use of the invention is seen. A sonic tool 10 is shown lowered on an armored multiconductor cable 12 into a borehole 14 (cased or otherwise) to take sonic logs of a subsurface formation 16. Tool 10 is provided with at least one sonic wave source or transmitter 10a, and a plurality (M) of sonic receivers. In FIG. 1, tool 10 is shown with two transmitters 10a and 10b, and eight receivers (M=8) 10c through 10j, it being appreciated that this is byway of example only and not intended to be limiting. The receivers are spaced along the length of tool 10 from each other and from the transmitter(s), and typically the distance between each transmitter and the receiver closest thereto is much greater than the inter-receiver distance. For example, the distance between the transmitter and the receiver nearest thereto is typically in the range of 5–25 feet, and the inter-receiver distance is typically less than half a wavelength of the sonic signal from the transmitter; e.g., about a half a foot to a foot. Tool 10 is adapted from movement up and down borehole 14, and as the tool 10 is moved, the transmitter 10a periodically generates a sonic signal. The generated sonic signal travels through the borehole and/or through the formation, and the receivers typically detect some energy which results from the generated signal. The mechanism for moving the tool 10 in the borehole includes the cable 12 which extends to the sheave wheel 18 at the surface of the formation, and then to a suitable drum and winch mechanism 20 which raises and lowers the tool 10 in the borehole as desired. Electrical connection between transmitter 10a (and 10b) and receivers 10c through 10i on the one hand, and the surface equipment on the other hand, is made through suitable multi-element slipping and brush contact assembly 22 associated with the drum and winch mechanism 20. A unit 24 contains tool control and pre-processing circuits which send electrical signals to tool 10 and receive other electrical signals (sonic logs) therefrom via cable 12 and assembly 22. Unit 24 cooperates with depth recorder 26 which derives depth level signals from depth measuring wheel 28 so as to associate the signals from receiver 10c through 10n with respective depth levels z in borehole 14. The outputs of sonic receivers 10c through 10n, after optional pre-processing in unit 24, are sent to signal storage 30, which can also receive signals from or through depth recorder 26 so as to associate sonic receiver outputs with respective depth levels z in borehole 14. Storage 30 can store the outputs of sonic receivers 10c through 10j in analog form but more typically stores them in the form of digital sonic log measurements, a set for each respective depth level z, derived by digitizing such analog signals, for example in unit 24. Storage 30 can comprise a magnetic storage device such as a disk or tape, and/or other storage media such as semiconductor or equivalent memory circuits. In the case of tool 10 having eight receivers, eight respective waveforms of five hundred twelve digitized measurements each can be produced for every six inches of borehole, which translates to many millions of digitized log measurements for the typical borehole which is several thousands feet deep. Thus storage 30 should preferably have the capacity appropriate for the task. The processing of the digitized log measurements is then accomplished by a computer or processor 32 which processes the information according to the techniques set forth below with reference to FIG. 7. The output of the processing is preferably a log of formation slowness with error bars versus formation depth z as described below with reference to FIGS. 8a and 8b. In addition, semblance values at particular depths may also be provided.

Figure 2:
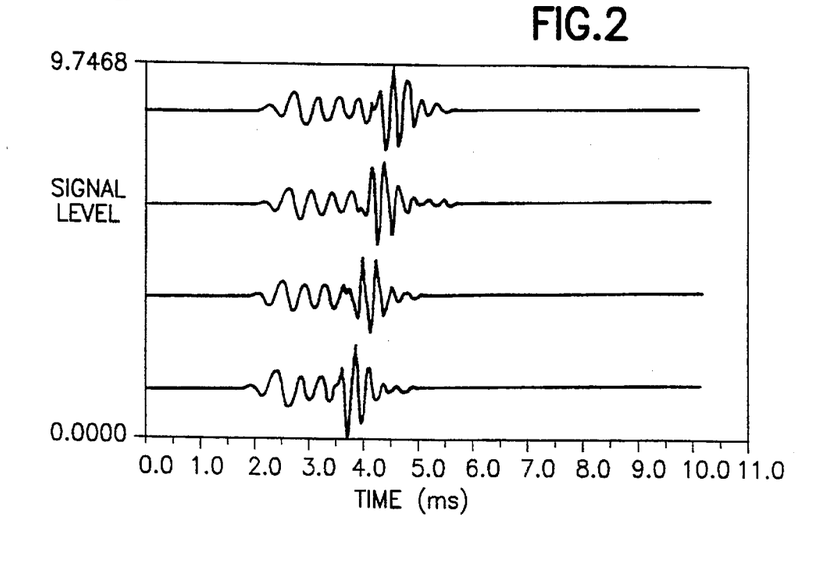
FIG. 2 illustrates waveforms of sonic signals received at a set of sonic receivers spaced from each other along the length of a sonic tool and from a transmitter carried by the same tool.

The response of any given one of receivers 10c through 10j to a sonic signal from transmitter 10a (or 10b) is typically a waveform of the general type illustrated in FIG. 2. As seen in FIG. 2, the responses of the several receivers are staggered in time due to the different spacing of the receivers from the transmitter. It will be appreciated that where the sonic signal detected is non-dispersive (e.g., P-waves and S-waves), the signal shape obtained at each receiver will take the same or similar form. However, where the sonic signal is dispersive (e.g., flexural waves), the signal changes shape as it traverses the receiver array. Thus, the waveforms shown in FIG. 2 are illustrative of a dispersive wave. Where dispersive waves are being processed, in order to obtain optimal results for semblance and slowness determinations, it is desirable to process the waves as taught in the parent application hereto. However, it should be appreciated that regardless of how processed, the error bar (variance) determinations will be essentially unaffected.

Before turning to the method of processing the digitized log measurements by a computer or processor (which will be described with reference to FIG. 7) an understanding of the theoretical basis of the method is instructive. If $x_{ik}$ is the complex spectral value for backpropagated sonic signals at an assumed slowness $\alpha$, with frequency, $i=1 \ldots N$, at receiver $k$, $k=1 \ldots M$, then the total T and coherent C energies of the signals can be defined by:

$$T = \sum_i \sum_k |x_{ik}|^2 \qquad (1)$$

$$C = \frac{1}{M} \sum_i \left| \sum_k x_{ik} \right|^2 \qquad (2)$$

The semblance $\rho$ is then defined as $$\rho = C/T. \qquad (3)$$

The average signal at frequency i is:

$$\bar{x}_i = \frac{1}{M} \sum_k x_{ik} \qquad (4)$$

and the normalized mean-squared error (NMSE), $\epsilon^2$ is defined as $$\epsilon^2 = \frac{1}{T} \sum_i \sum_k |x_{ik} - \overline{x_i}|^2 = I/T \tag{5}$$

where the energy I is called the incoherent energy. The semblance and NMSE are related by $$\rho = 1 - \epsilon^2, \tag{6}$$

and it will be appreciated that the total energy T is equal to the coherent energy C plus the incoherent energy I $$T = C + I \tag{7}$$

regardless of assumptions about $x_{ik}$.

If the spectral values $x_{ik}$ for the sonic signals are defined according to:

$$x_{ik} = s_{ik} + n_{ik}, \tag{8}$$

where $s_{ik}$ are known values and the $n_{ik}$ represent noise and are independent, unit variance, zero mean, Gaussian random variables, then the energies T, C, and I, as well as the semblance and NMSE are random variables. The assumption of unit variance on the $n_{ik}$ allows derivation of the results in terms of classical probability density functions.

From equation (2) it is seen that C is the sum of the squares of 2N Gaussian random variables having non-zero means (N being the number of independent frequency points or spectral lines in the processing band). There are 2N random variables because the $x_{ik}$ are complex. Hence C has a non-central chi-squared distribution with 2N degrees of freedom: $\chi'^2(2N, \lambda)$. The non-centrality parameter for this distribution $\lambda$, may be given by:

$$\lambda = \frac{1}{M} \sum_i \left| E\left[\sum_k x_{ik}\right] \right|^2 = \frac{1}{M} \sum_i \left| \sum_k s_{ik} \right|^2 \tag{9}$$

If the $n_{ik}$ are known but do not have unit variance as assumed, then the $x_{ik}$ may be scaled by $1/\sqrt{n_{ik}}$ to achieve unit variance on the scaled $n_{ik}$. Then, $$\lambda = \frac{1}{M} \sum_i \left| \sum_k \left\{ \frac{s_{ik}}{\sqrt{n_{ik}}} \right\} \right|^2 \tag{10}$$

so that $\lambda$ depends on the relative squared values of signal and noise.

From equations (1), (2) and (7), it will be appreciated that the incoherent energy I is the sum of the squares of zero-mean Gaussian random variables and has a central chi-square distribution of 2N(M−1) degrees of freedom. The factor of M−1

$$\overline{\lambda}_0 = 2N \left[ \kappa \left\{ \frac{(M-1)\overline{\rho}}{1-\overline{\rho}} \right\} - 1 \right]$$

rather than M accounts for the subtraction of the average for each term.

From equations (3) and (7), it can be seen that the semblance is distributed as the ratio of a non-central chi-squared variable $\chi'^2(2N, \lambda)$, and the sum of that variable and a central chi-squared variable $\chi'^2(2N(M-1))$:

$$\rho = C/(C+I) \tag{11}$$

$$\epsilon \; \beta'(2N, 2N(M-1), \lambda) \tag{12}$$

where $\beta$ $(2N, 2N(M-1), \lambda)$ is the non-central beta distribution of classical statistics. While explicit forms for the mean and variance of the central beta distribution are available, the means and variances for the non-central beta distribution are expressed in terms of an infinite series as set forth in Appendix A hereto. Alternatively, they may be approximated (as set forth in Appendix B hereto) according to either $$\sim 2N \left[ \frac{M\overline{\rho} - 1}{1 - \overline{\rho}} \right] \tag{13}$$
$$\tag{14}$$

where $\kappa = [2N(M-1)/(2N(M-1)-2)]$ \hfill (15)

or $$\overline{\lambda}_1 = \overline{\lambda}_0 + \frac{\kappa 2N(M-1)}{(1-\overline{\rho})^2} (\overline{\rho} - \mu_0^\beta) \tag{16}$$

where $\overline{\lambda}_1$ is a first order approximation to the beta distribution non-centrality parameter. Although further iterations might be applied $\overline{\lambda}_1$ is usually adequate for practical purposes.

Although the results are the same in either domain, the derivation of the beta distribution non-centrality parameter is simpler in the frequency domain. If each waveform is of duration T seconds and occupies a bandwidth of B Hz, and if the data is Fourier-transformed, the spectral line spacing is 1/T (Hz), and the number of complex spectral lines in the band B is $$N = B/(1/T) = BT \tag{17}$$

If the continuous time domain noise is white, the noise components of these spectral lines are nearly independent for N>10. If N is small, the independence of the noise components of the spectral lines is taken as an approximation.

In the time domain, if the waveforms are limited to a bandwidth B and a time duration T, then they can be represented by 2N real samples, which is equivalent in the previous time-domain derivation to N complex coordinates. The noise components of these real samples will be independent for white Gaussian noise only for large N, as is the case for the spectral lines.

If $x_{ik}^a$ is the ("un-backpropagated") acoustic signal at receiver k at frequency i, i=1 ... N, and the signal consists of a propagating acoustic wave $s_{ik}^a$ with added zero mean Gaussian noise $n_{ik}^a$, then $$x_{ik}^a = s_{ik}^a 30 \; n_{ik}^1 \tag{18}$$

where $$s_{ik}^a = s_i e^{\xi_i(k-1)\alpha_1} \tag{19}$$

is a non-attenuating propagating wave having phase slowness $\alpha_i$ at frequency i, and $$\xi_i = j2\pi\delta f_i \tag{20}$$

where $\delta$ is the uniform inter-receiver spacing. The signal energy at a single receiver E, is then $$E = \sum_i |s_i|^2 \tag{21}$$

The noise $n_{ik}^a$ is assumed to be independent both in frequency, i, and spatially, k. The variance of the complex variable $n_{ik}^a$ can depend on both i and k. If the variance of the $n_{ik}^a$ does not depend on i and k, then the noise is the same in all receivers and white. To facilitate understanding of the general case in terms of this simple case, let $$N_0/2 = \min_{i,k} \text{Var}[n_{ik}{}^a] \tag{22}$$

Then, the variance of $n_{ik}{}^a$ can be given as $$\text{Var}[n_{ik}{}^a] = N_{ik}(N_0/2) \tag{23}$$

where $N_{ik} \geq 1$. In the case of white noise having the same variance on all receivers ($N_{ik}=1$) for all i, k, then $N_0$ is the single-sided noise power spectral density prevalent in the prior art literature. It is single-sided in the sense that it is the sum of the spectral energies at both positive and negative frequencies. This normalization by $N_0/2$ does not reduce the generality of the analysis and is helpful in understanding the white noise, equal-receiver-variance case.

The waveforms $x_{ik}{}^t$ recorded by a tool include complex factors $\Psi_{ik}$ corresponding to the complex gains on each receiver and at each frequency such that $$x_{ik}{}^t = \Psi_{ik} x_{ik}{}^a \tag{24}$$

For an ideal tool, $\Psi_{ik}=1$. It should be appreciated that even if the input noise $n_{ik}{}^a$ is white, if $|\Psi_{ik}| \neq 1$, the noise on $x_{ik}{}^t$ will be non-white.

The theory previously presented is for white noise. Assuming, therefore, that the noise variance $N_{ik}$ ($N_0/2$) and are known for all i,k, then a whitening filter can be applied to the recorded waveforms to produce data with white noise and unit variance. The whitening filter gain for the k-th receiver at each frequency i is $$|A_k(f_i)| = \frac{1}{|\psi_{ik}| \sqrt{N_{ik}(N_0/2)}} \tag{25}$$

The phase of the whitening filter is not critical as long as it is the same for all receivers. The output of the whitening filter is $$x_{ik}{}^w = \frac{x_{ik}^t}{|\psi_{ik}| \sqrt{N_{ik}(N_0/2)}} = \frac{\psi_{ik}}{|\psi_{ik}|} \frac{1}{\sqrt{N_{ik}(N_0/2)}} x_{ik}^a \tag{26}$$

which has white, unit variance noise.

If the whitened signal is backpropagated at phase slowness $\overline{\alpha}_i$, a signal $x_{ik}$ is obtained, where $$x_{ik} = x_{ik}^w e^{-\xi_i(k-1)\overline{\alpha}_i} \tag{27}$$

If $G_{ik}$, which is a function of $\alpha_i$, $\overline{\alpha}_i$ is defined by:

$$G_{ik} = e^{\xi_i(k-1)(\alpha_i - \overline{\alpha}_i)} \tag{28}$$

when $|G_{ik}|=1$, $G_{ik}$ is a phase factor. If $x_{ik}$ is backpropagated at the correct slowness $\alpha_i=\overline{\alpha}_i$, then $G_{ik}=1$. The backpropagated signal $x_{ik}$ is given by $$x_{ik} = s_{ik} + n_{ik} \tag{29}$$

where $$s_{ik} = \frac{\psi_{ik}}{|\psi_{ik}|} \frac{1}{\sqrt{N_{ik}(N_0/2)}} G_{ik} s_i \tag{30}$$

It should be noted that $\Psi_{ik}/|\Psi_{ik}|=1$ is also a phase factor. Since the backpropagation does not change the noise variance, the variance of the $n_{ik}$ is 1, and the theory set forth with respect to equations (1) through (16) applies. Hence, from equations (9) and (12), the semblance calculated from $x_{ik}$ will have a non-central beta distribution with $$\lambda = M(2E/N_0) \sum_i U_i \frac{|s_i|^2}{E} = M(2E/N_0)U \tag{31}$$

where $$U_i = (1/M^2) \left| \sum_k \frac{\psi_{ik}}{|\psi_{ik}|} \frac{1}{\sqrt{N_{ik}}} G_{ik} \right|^2 \tag{32}$$

and $$U = \sum_i U_i \frac{|s_i|^2}{E} \tag{33}$$

Each $U_i \leq 1$ because $N_{ik} \geq 1$ for each i,k by definition. Similarly, $U \leq 1$. The quantity $2E/N_0$ is the matched filter signal to noise ratio and can be expressed in decibels. (See, Scharf, Louis L., *Statistical Signal Processing, Detection Estimation and Time Series Analysis*, Addison-Wesley (New York, 1991)). As seen from equation (31), the non-central beta distribution parameter $\lambda$ is proportional to the signal to noise ratio $2E/N_0$, and the constant of proportionality depends on a spectral-weighted average U of the $U_i$. Each $U_i$ can be viewed as a loss factor at frequency i due to receiver gain differences ($\Psi_{ik}$), non-white or receiver-dependent noise ($N_{ik}$), or a misestimated slowness ($G_{ik}$).

Given U, an inversion for the signal to noise ratio $2E/N_0$ from the non-central beta distribution parameter $\lambda$ is possible. If $\lambda$ is the non-centrality parameter estimated using equation (14), $$\overline{(2E/N_0)} = \tag{34}$$

$$\frac{1}{U} \frac{2N}{M} \left\{ \kappa \left[ \frac{(M-1)\overline{\rho}}{1-\overline{\rho}} \right] - 1 \right\} - \frac{1}{U} \frac{2N}{M} \left\{ \frac{M\overline{\rho}-1}{1-\overline{\rho}} \right\}$$

for $2N(M-1) \gg 1$. Alternatively, $$\overline{(2E/N_0)} = (1/MU)\overline{\lambda}_1 \tag{35}$$

where $\overline{\lambda}_1$ is found from the first order approximation to the non-centrality parameter of the beta distribution via equation (16). In either case, the signal to noise ratio $2E/N_0$ can be estimated from $\overline{\rho}$.

An approximation to equation (34) in high-semblance situations (e.g., Stoneley waves) yields an easily-computed signal-to-noise ratio $2E/N_0$ which can be adjusted to compensate for practical tool and processing effects. In particular, if $M\overline{\rho}-1$ is taken to equal $M-1$; i.e., $\overline{\rho} \sim 1$, then if $10 \log_{10}$ of both sides of equation (34) are taken, the estimate of the signal-to-noise ratio in decibels is found to be:

$$\overline{(2E/N_0)} (dB) = 10 \log_{10}[N(M-1)/(MU)] - 10 \log_{10}(1-\overline{\rho}) \tag{36}$$

The second term on the right-hand side of equation (36) is seen from equations (5) and (6) to be the normalized mean square error (NMSE) expressed in decibels. Equation (36) can be rewritten as $$\overline{(2E/N_0)} (db) = Z (db) - \overline{NMSE} (db) \tag{37}$$

where $Z (dB) = 10 \log_{10}[N(M-1)/(MU)]$. With this approximation, the signal-to-noise ratio in decibels is the negative of the NMSE in decibels plus a constant. The value of Z in decibels can be adjusted in practice based on Monte-Carlo experiments to compensate for anomalies in the tool or processing.

Two additional special cases provide insight to the above discussion. The first is under the idealized condition of white noise of equal variance on each receiver, a correct back-propagating slowness, and a perfect tool where $N_{ik}=G_{ik}=\Psi_{ik}=1$. Under these conditions, $U_i=U=1$, and equations (34) and (35) likewise simplify. In addition, with noise alone, increasing the 2BT decreases the mean semblance. Thus, increasing either the bandwidth B or the time duration T reduces the mean semblance.

Another special case occurs when the noise is white and has equal variance on each receiver, and the backpropagation is correct, but the tool phase response is non-ideal; i.e., where $N_{ik}=G_{ik}=\Psi_{ik}=1$, and $$U_i = \frac{1}{M^2}\left|\sum_k \psi_{ik}\right|^2 = \frac{1}{M}\frac{\left|\sum_k \psi_{ik}\right|^2}{\sum_k |\psi_{ik}|^2} = \rho_i^* \tag{38}$$

where $\rho^*_i$ is the semblance which would be obtained at frequency i at zero slowness if the same signal was applied to each receiver. Similarly, $$U = \sum_k \rho_i^* \frac{|s_i|^2}{E} = \rho^* \tag{39}$$

is the spectral-weighted average of the semblances $\rho^*_i$, and $\rho^*$ is the semblance that would be obtained at zero slowness if the same signal having spectrum $|s_i^2|$ were applied to each receiver.

In practice, the receiver gains $\Psi_{ik}$ may not be known, but a reasonable estimate of $\rho^*$ might be made. This $\rho^*$ can then be introduced into the $2E/N_0$ measurement by setting $U=\rho\rho^*$ in equations (34) and (35).

It should be noted that for fixed $\bar{\rho}$ and a non-ideal tool ($\rho^*<1$), the estimated $2E/N_0$ without accounting for $\rho^*$ is always less than would be obtained if the non-idealities of $\rho^*$ were included. Thus, in the situation discussed below where the Cramer-Rao bounds on the slowness variance will be shown to be inversely proportional to the signal to noise ratio $2E/N_0$, an underestimation of the signal to noise ratio causes these bounds to be larger. Hence, failure to include tool non-idealities in the bounds calculation leads to an over-estimation of the measurement variance.

The results obtained above are applicable both to the frequency and time domains. In the time domain, which is used extensively in STC processing, N=BT may not be an integer. However, this has no effect on the derivations. A problem does arise, however, because of the difficulty in achieving both a band limitation and noise whiteness. Practical filters have some ripple in their passbands and do not have infinitely sharp cut-offs at the band-edges. The ripple in the passband and the finite cut-offs violate the whiteness requirements of the theory.

An approximate approach in this case is to empirically determine an "effective" N ($N_{eff}$), and use it in the preceding theory. One way to do this is to perform Monte-Carlo simulations of the filter and processing on instances of white, Gaussian noise of known $2E/N_0$. The mean of the measured $2E/N_0$ is calculated over the trials assuming a particular N based on B and T. The value of N is adjusted until the measured and applied $2E/N_0$'s agree. The value of N when they agree is called $N_{eff}$ and is used in subsequent logging with the filter and time window. $N_{eff}$ can be used as the approximate value for N in the earlier equations. Alternatively, the constant Z (dB) can be adjusted for equation (37).

The Cramer-Rao bounds have been derived in Kelly, E. J. Jr., and M. J. Levin, "Signal Parameter Estimation for Seismometer Arrays", *Lincoln Laboratory, MIT Technical Report* 339, (Jan. 8, 1964), and have been extended to handle dispersive waves in Stoica, P. and Nehorai, A., *Advances in Spectrum Analysis and Array Processing;* Vol. 2, Chapter "Statistical Efficiency Study of Direction of Estimation Methods", Part I Analysis of MUSIC and a Preliminary Study of MLM, pp. 263–306, Prentice Hall, 1991. If $\alpha_p(f)$ is the phase slowness for a dispersive wave of slowness $\alpha$ at frequency f, then $\partial\alpha_p(f)/\partial\alpha$ is the derivative of the phase slowness with respect to the formation slowness. This partial derivative is 1 for non-dispersive waves. For dispersive waves such as flexural mode waves, it is 1 at zero frequency, and decreases as frequency increases. If the receiver positions $r_k$ are described on an axis such that $$\sum_k r_k = 0 \tag{40}$$

then, from Kelley and Levin as modified by Stoica and Nehorai, the Cramer-Rao bound on the variance of the slowness estimate is given by:

$$\frac{1}{\sigma_{CR}^2} = K_{array}\Omega \tag{41}$$

where $$\Omega = \frac{(2\pi)^2}{(N_0/2)} \int f^2 |S(f)|^2 \left(\frac{\partial\alpha_p(f)}{\partial\alpha}\right)^2 df \tag{42}$$

and $$K_{array} = \sum r_k^2 \tag{43}$$

For a uniformly spaced array of M receivers with receiver spacing $\delta$ $$K_{array} = (1/12) M(M^2-1) \delta^2 \tag{44}$$

$K_{array}$ for array sonics depends only on the tool design and which receivers are operating. If $K_{signal}$ is defined by:

$$K_{signal} = \frac{1}{E} \int f^2 |S(f)|^2 \left(\frac{\partial\alpha_p(f)}{\partial\alpha}\right)^2 df \tag{45}$$

where the total signal energy E is defined by $$E = \int |S(f)|^2 df \tag{46}$$

$K_{signal}$ depends on both the signal spectrum and its dispersion.

Thus, equation (41) becomes $$\frac{1}{\sigma_{CR}^2} = (2\pi)^2 K_{array} K_{signal} (2E/N_0) \tag{47}$$

so that the Cramer-Rao bounds vary inversely with $K_{array}$, $K_{signal}$, and the signal to noise ratio $2E/N_0$. Increasing the array length ($K_{array}$), the signal high-frequency content ($K_{signal}$), or the signal to noise ratio ($2E/N_0$), reduces the measurement variance.

The theory set forth above shows that the signal to noise ratio $2E/N_0$ can be estimated from the semblance in conjunction with knowledge of the number of receivers M, and the processing 2BT product (see equations 34 and 35 above), and that the lower bounds on the slowness error can be calculated from the signal to noise ratio, plus the array, processing and signal parameters (see equation 45 above). In addition, using techniques discussed below with reference to FIGS. 3–7, it has been determined the signal to noise ratio is well estimated by the semblance, and that the estimated Cramer-Rao lower bounds closely approximates the actual slowness variance for practical signal to noise ratios.

A Monte-Carlo simulation was performed to investigate the $2E/N_0$ estimation and Cramer-Rao bounds. A dispersive signal waveform corresponding to known formation characteristics was constructed from a model of a borehole flexural wave. In the absence of noise, the processing would be expected to return exactly the formation shear slowness of the signal. From this signal, many noisy data instances were constructed by adding white Gaussian noise from a random number generator at a specified signal to noise ratio $2E/N_0$. At each $2E/N_0$, the dispersive (QSTC) processing was applied to one thousand noisy data instances, and the statistics of measured formation shear slowness, semblance, measured $2E/N_0$, and the Cramer Rao bounds were calculated. Results were calculated for signal to noise ratios ($2E/N_0$) of between four and thirty decibels in two decibel steps.

Figure 3A:
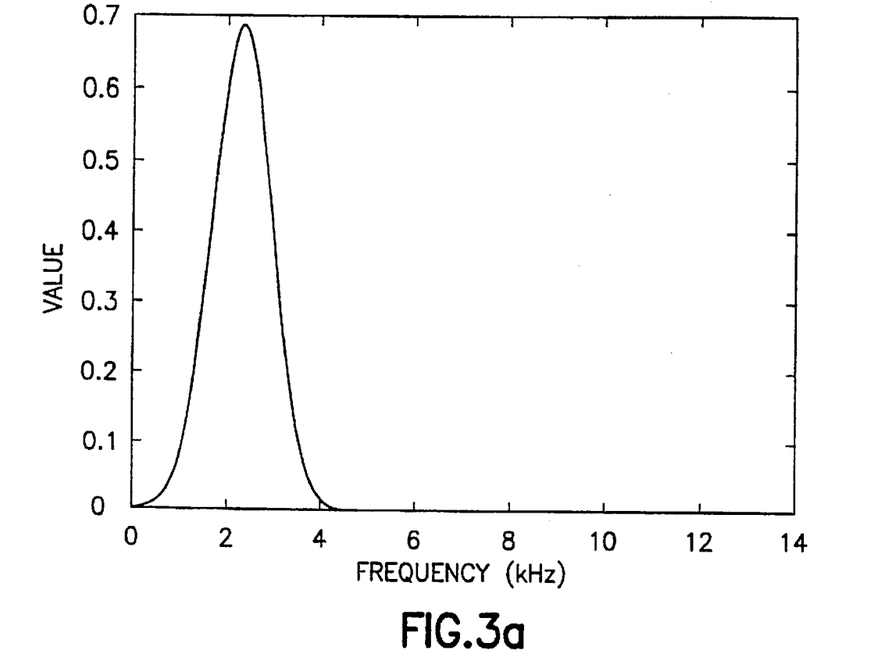
FIG. 3a is a spectrum of a simulated generated acoustic signal.
Figure 3B:
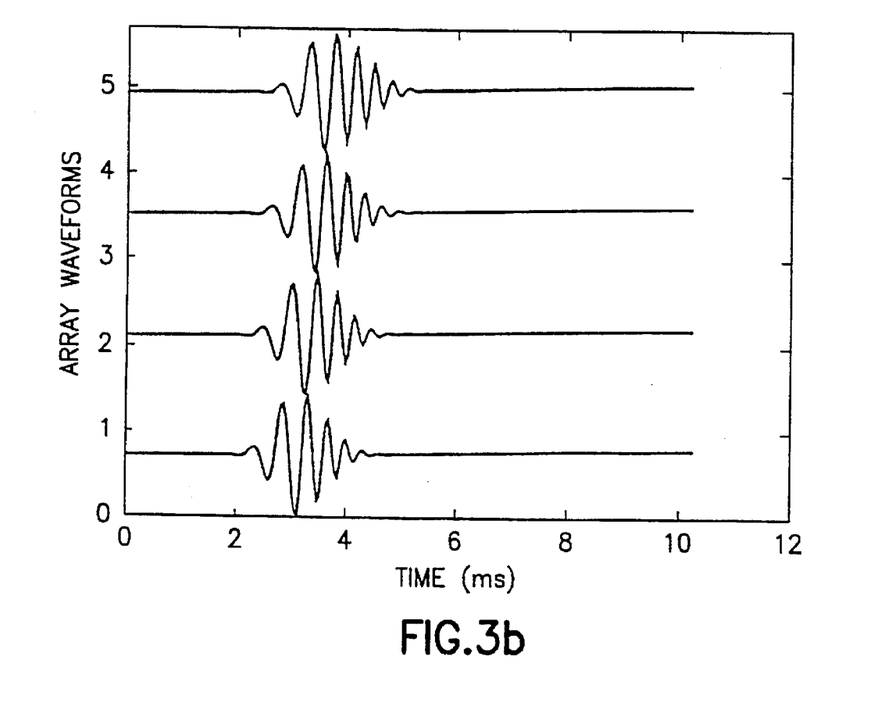

The simulation was based on a signal having a 2.3 kHz center frequency with a Gaussian envelope having a time width (plus or minus one standard deviation) of 500 μs. The spectrum of the signal is seen in FIG. 3a. The signal of FIG. 3a was simulated as propagating over a DSI transmitter to a first receiver spacing of eleven feet in an eight receiver array. The propagation was modelled according to a flexural mode dispersion curve corresponding to a 160 μs/ft formation slowness, a hole diameter HD=12.0 inches, $S_{fluid}$=203 μs/ft, and $V_p/V_s$=1.90. The resulting modelled detected dispersive waveforms are seen in FIG. 3b. To these waveforms, the white Gaussian noise was added to produce waveforms with a specified $2E/N_0$ in approximately the 1.5 to 3.1 KHz processing band. The waveforms were then processed according to the QSTC techniques described in co-owned U.S. Pat. No. 5,278,805 with a center frequency of 2.3 kHz, a Q=1.5, and 2BT=8, which generally correspond to the chosen processing frequency band and a time window length of 2.6 ms. Before processing, the data was filtered with a one hundred and one point window method filter (at a 40 μs sampling rate). To ensure that the noise spectrum was flat across the processing band (i.e., white), the filter was twenty percent wider than the processing band. The filtered waveforms were then processed according to the QSTC technique using the dispersion curve which generated the waveforms. The initial results were window positioned to maximize the stacked energy in the window as well as window positioned to maximize the semblance.

Figure 3C:
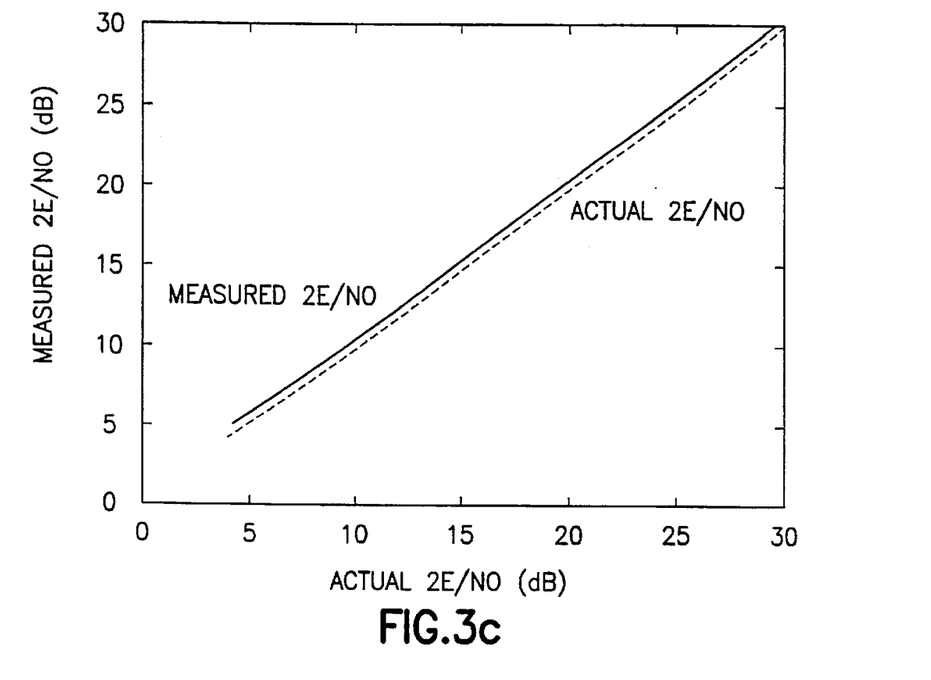
FIG. 3c is a plot of a mean estimated signal to noise ratio in decibels versus the actual signal to noise ratio in decibels derived from the waveforms of FIG. 3b in the presence of white Gaussian noise in a predetermined processing band.

FIG. 3c provides a plot of the mean estimated signal to noise ratio (using equation 34) in decibels (solid line) versus the actual signal to noise ratio (dashed line) obtained from the Monte Carlo simulation. As seen in FIG. 3c, the mean estimated $2E/N_0$ is consistently about 0.5 dB more than the actual $2E/N_0$ which is consistent with the measured semblance being slightly greater than expected from the theory. This bias is believed to be a result of the windowing operation which causes noise spectral values to become correlated.

Figure 4:
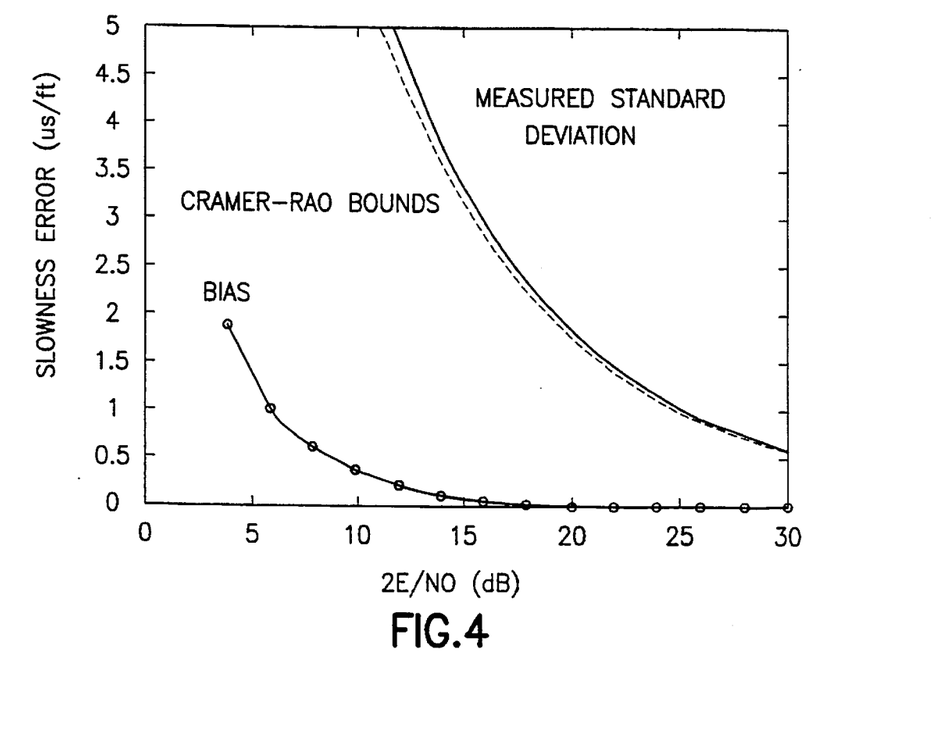
FIG. 4 is a plot of the measured and estimated slowness standard deviations as a function of the noise of FIG. 3c.

FIG. 4 plots the measured slowness standard deviation (solid line) as a function of the applied $2E/N_0$. The mean Cramer-Rao bounds calculated from the measured $2E/N_0$ from a Monte Carlo simulation are shown by dashed lines using a $K_{signal}$ measured on a trial-by-trial basis from equation (44) taking the receiver average power spectrum as $|S(f)|^2$. The partial derivatives $\partial \alpha_p(f)/\partial \alpha$ are obtained numerically from stored values of the flexural dispersion curve. For $2E/N_0 \geq 16$ dB, the maximum difference between the estimated Cramer-Rao bound and the actual standard deviation is about $\leq 0.2$ μs/ft.

The theory on which the Cramer-Rao bounds is based assumes that the processing yields an unbiased estimate.

FIG. 4 shows the absolute value of the measurement bias. For $2E/N_0 \geq 16$ dB, the absolute value of the bias is less than 0.1 μs/ft. Since the Cramer-Rao bounds gives the smallest possible variance for any unbiased estimator, the agreement of the standard deviation and Cramer-Rao bound curves and the small bias show that the processing is nearly the optimal unbiased estimator under these conditions. Thus, QSTC processing with energy-positioned windows may be considered an optimal processing for the array sonic data under added Gaussian noise.

Figure 5:
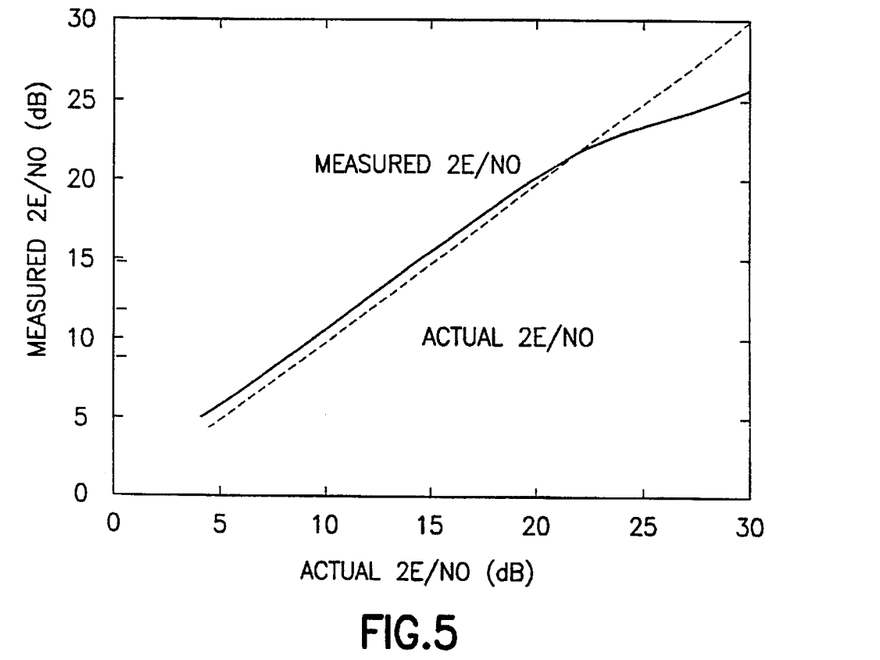
FIG. 5 is a plot of the mean estimated noise in decibels versus the actual noise in decibels for dispersive acoustic waves processed according to the QSTC method of positioning the window to maximize semblance.

The preferred windowing method for QSTC is to position the window to maximize the semblance rather than the stacked energy. This allows the exclusion of unwanted, "late" arrivals from the processing window. However, as is seen with respect to FIGS. 5 and 6, QSTC with the positioning of windows to maximize semblance does not provide as good a result as the positioning of windows to maximize energy. In particular, FIG. 5 provides a plot of mean estimated $2E/N_0$ in decibels (solid line) versus the actual $2E/N_0$ in decibels (dashed line) for QSTC processing with the preferred semblance-positioned windows. At low signal to noise levels, the mean estimated $2E/N_0$ is as much as one decibel more than the actual $2E/N_0$, but this bias diminishes and becomes negative as the $2E/N_0$ increases.

Figure 6:
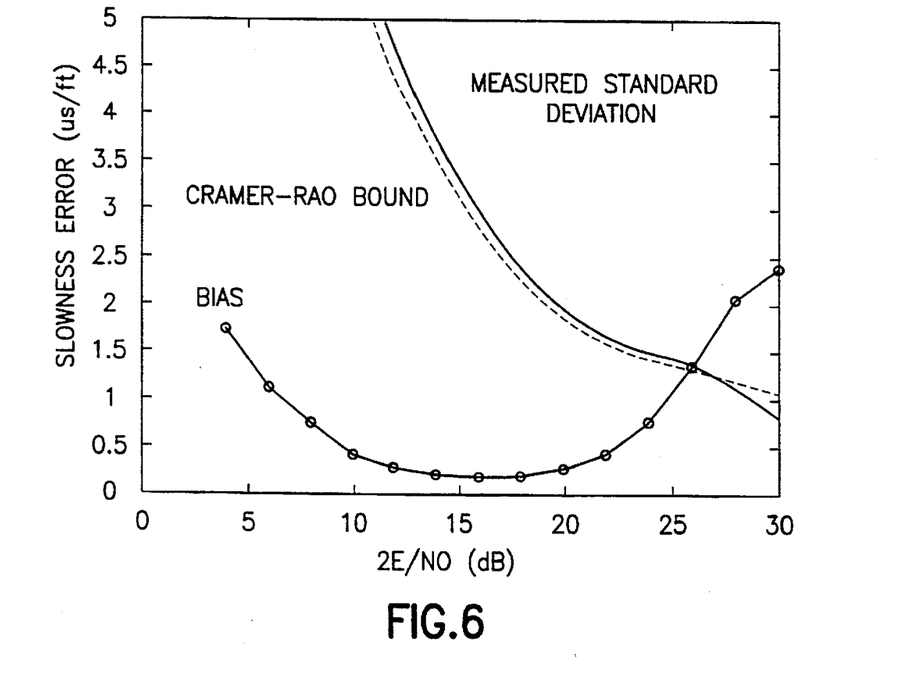
FIG. 6 is a plot of the measured and estimated slowness standard deviation as a function of the noise.

FIG. 6 gives the measured slowness standard deviation (solid line) as a function of the applied $2E/N_0$. The mean Cramer-Rao bounds calculated from the measured $2E/N_0$ are shown by dashed lines. For $2E/N_0 \geq 16$ dB, the maximum difference between the estimated Cramer-Rao bound and the actual standard deviation is less than 0.2 μs/ft. However, above $2E/N_0$=28 dB, the processing achieves a better slowness standard deviation than predicted by the calculated $2E/N_0$. This is consistent with the above result that the measured $2E/N_0$ is much less than the actual $2E/N_0$ for these values of $2E/N_0$.

The absolute value of the measurement bias is also shown in FIG. 6. The shape of the bias curve is significantly different than that for the energy positioned windows of FIG. 4. The absolute value of the bias achieves a minimum of about 0.3 μs/ft at $2E/N_0$=18 dB. Then, the absolute value of bias rises to 2.4 μs/ft at $2E/N_0$=30 dB. This bias is clearly caused by the semblance positioning. Fortunately, $2E/N_0$ in excess of 25 dB are seldom encountered in the field.

Because of the measurement bias, QSTC with semblance-positioned windows is not an efficient estimator. However, it should be appreciated that the loss in performance due to semblance-positioned windowing is relatively small compared to the errors induced by late arriving signals. Thus, QSTC with semblance-positioned windows is the preferred technique.

Because the Cramer-Rao bounds are close to the actual measurement variance, they represent a reasonable estimate of the actual measurement slowness. Consequently, standard deviation error bars can be constructed by adding and subtracting the Cramer Rao standard deviation to the measured slowness. Under the assumptions of the classical model and high $2E/N_0$, the probability of the correct formation slowness being within these error bars is 68%. If the error bars are doubled (twice the standard deviation), the probability will increase to 95%.

Figure 7:
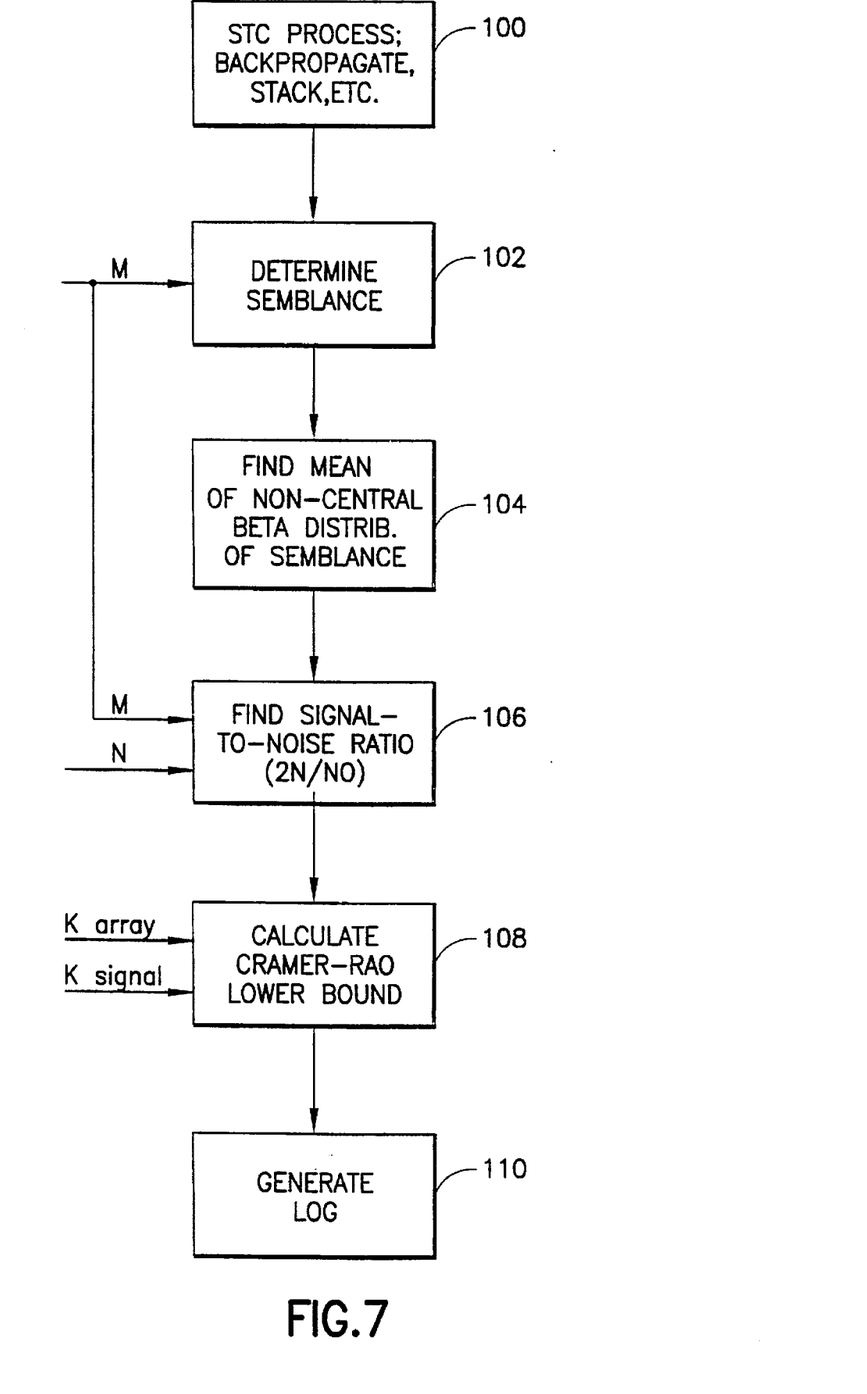
FIG. 7 is a block diagram of the processing accomplished by the processing means of FIG. 1 in accord with the invention.

Turning to FIG. 7, and based on the above theory and analysis, a flow chart is seen of the processing accomplished by the processor 32 of tool 10. Thus, for data at a given depth in the borehole, the waveforms received by the M detectors of the tool 10 are preferably processed at 100 by backpropagating, stacking, and otherwise processing the data according to a desired slowness-time coherence algorithm (STC, QSTC, etc.). Since it is desirable to obtain the most accurate semblance and slowness determinations possible, the method of calculating semblance is preferably chosen depending upon the type of waves being processed. Thus, for example, where dispersive waves (e.g., flexural, Stoneley) are processed, the methods of the parent application hereto are utilized in order to choose an optimal frequency band for semblance processing. Then at 102, a semblance determination is made where the semblance is determined using equation (1)–(3) and (8) above according to $$\rho = \frac{1}{M} \frac{\Sigma|\Sigma s_{ik} + n_{ik}|^2}{\Sigma\Sigma|s_{ik} + n_{ik}|^2} \qquad (48)$$

If more than one set of data are available for a given depth, each set of data may be separately processed at 100, and separate semblance determinations made at 102. Then at 104, the mean of the semblance determinations is found. In particular, if only one set of data is available, the mean is taken as the determined semblance. However, if more than one set of data is available, the mean of the semblance determinations can be calculated. Utilizing the mean semblance determination ($\bar{\rho}$), as well as knowledge of the time-bandwidth product N and the number of detectors M on the tool 10, the signal to noise ratio ($2E/N_0$) is found at 106 by relating the signal to noise ratio to a function of M, N, and $\bar{\rho}$ according to equations (34), (35), and (37). The signal to noise ratio $2E/N_0$ is then used at 108 along with constants $K_{array}$ and $K_{signal}$ as defined in equations (44) and (45) to provide the Cramer-Rao lower bound according to equation (47) above:

$$\frac{1}{\sigma_{CR}^2} = (2\pi)^2 K_{array} K_{signal} (2E/N_0).$$

The Cramer-Rao lower bound, as discussed above, in turn provides an excellent estimate of the standard deviation for that which the semblance is being found; e.g., for the formation shear slowness.

After an estimate of the standard deviation for the measurement being made (e.g., shear slowness) is determined by the processor 32 for each desired location in the borehole, the processor may then generate at 110 a log of the measurement in conjunction with an error bar; where the error bar is a function of the standard deviation (e.g., one or two standard deviations). In generating the log, if s is the measured slowness, it desirable to plot both the quantities s+$\sigma_{CR}$ and s–$\sigma_{CR}$ as the error bars.

Using the methods of the invention, and in particular accord with FIG. 7, two formation shear slowness logs utilizing dispersive STC were made of a one hundred foot interval of a well. The processing was accomplished in a 1 to 3 kHz band with a time window duration of 1.6 ms, and semblances were calculated. If s is taken as the actual slowness at each depth d, the slowness estimates obtained by the dispersive STC processing for the first and second passes through the well are denoted by $s_1$ and $s_2$ and are shown as dashed lines 201, 203 in FIG. 8a. The mean slowness $s_m$ (not shown in FIG. 8a) at depth d is then $s_m=\frac{1}{2}(s_1+s_2)$. Assuming that each slowness estimate $s_i$ has its own mean and is distributed according to a Gaussian distribution of standard deviation $\sigma$, and that the estimates from the repeat runs are independent, then $s_m$ will have a variance $\frac{1}{2}\sigma^2$.

Figure 8A:
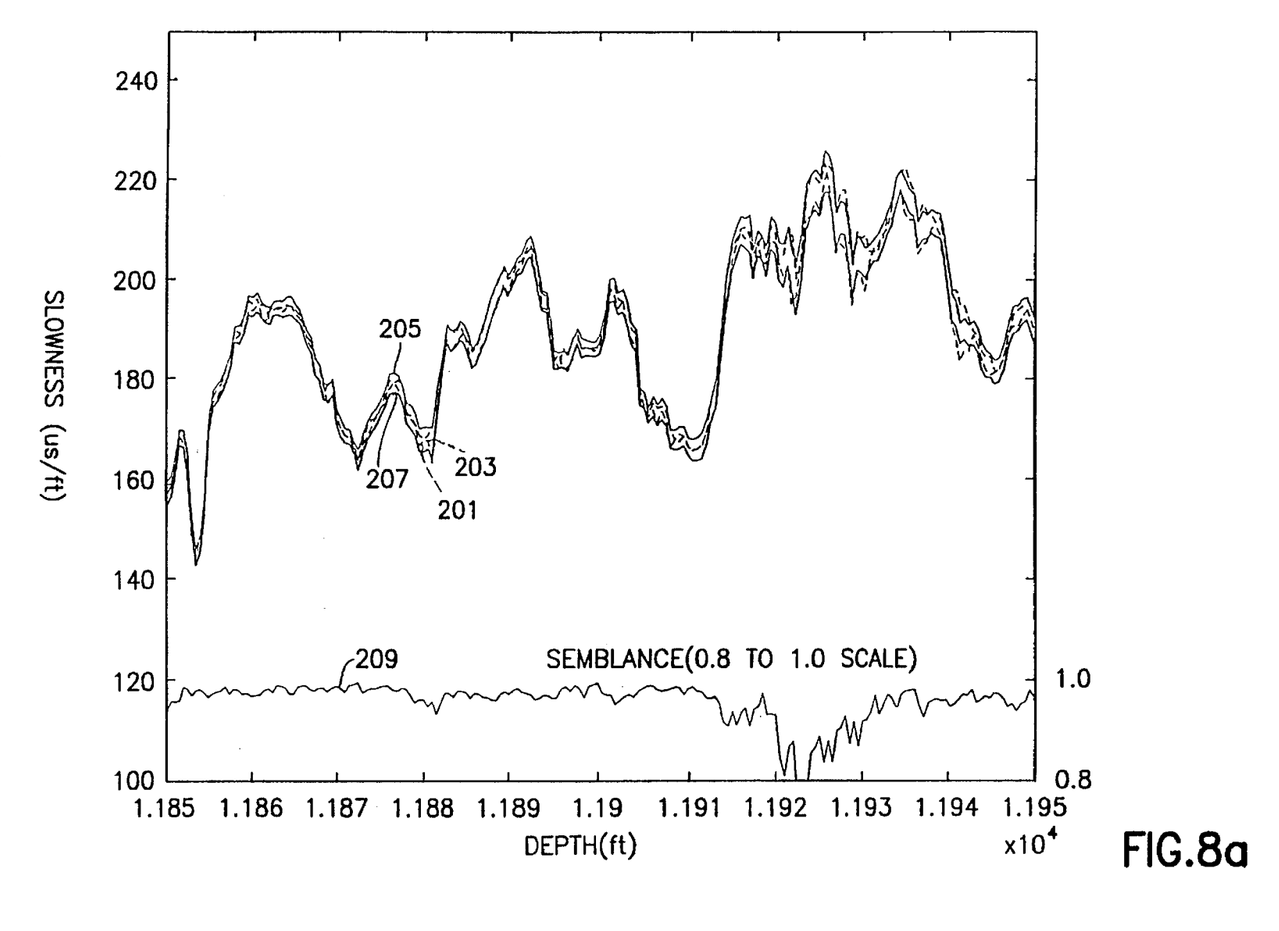
FIGS. 8a and 8b are logs of shear slowness with error bars over different portions of a formation, with accompanying semblance determinations.

At each depth, the signal to noise ratio $2E/N_0$ was estimated as in the Monte Carlo simulation described above, and the Cramer-Rao bounds at each depth were computed as discussed above with reference to FIG. 7. Then, by subtracting and adding the Cramer-Rao bounds to the determined mean slowness; i.e., $s_m+\sigma_{CR}$, $s_m-\sigma_{CR}$ an error bar log was generated as seen by the solid lines 205, 207 in FIG. 8a which extend on either side of the dashed lines. The average semblance is also shown in FIG. 8a as solid line 209.

Although the error bars in FIG. 12 generally coincide with the differences in the repeat runs, a quantitative comparison is possible. If the repeat-run variance is defined according to:

$$\sigma_R^2 = \frac{1}{2}\langle(s_1-s_2)^2\rangle \qquad (49)$$

where <> indicates average over depth d. Under the previous assumptions for the distribution of the estimates, the expected value of $\sigma_R^2$ is $\sigma^2$. For the data of FIG. 8a, the repeat run standard deviation is 1.9 μs/ft (1.0%). The average Cramer Rao standard deviation $\sqrt{\langle\sigma_{CR}^2\rangle}$ is 2.4 μs/ft (1.3%).

Another quantity of interest is the repeat bias difference $\mu R$, where $\mu_R=\langle(s_1-s_2)\rangle$. If both runs have the same bias, then the expected value of $\mu_R$ is zero. For the data of FIG. 8a, $\mu_R$ is 0.34 μs/ft (0.2%). This indicates that the biases, if any, are nearly the same for each run.

Figure 8B:
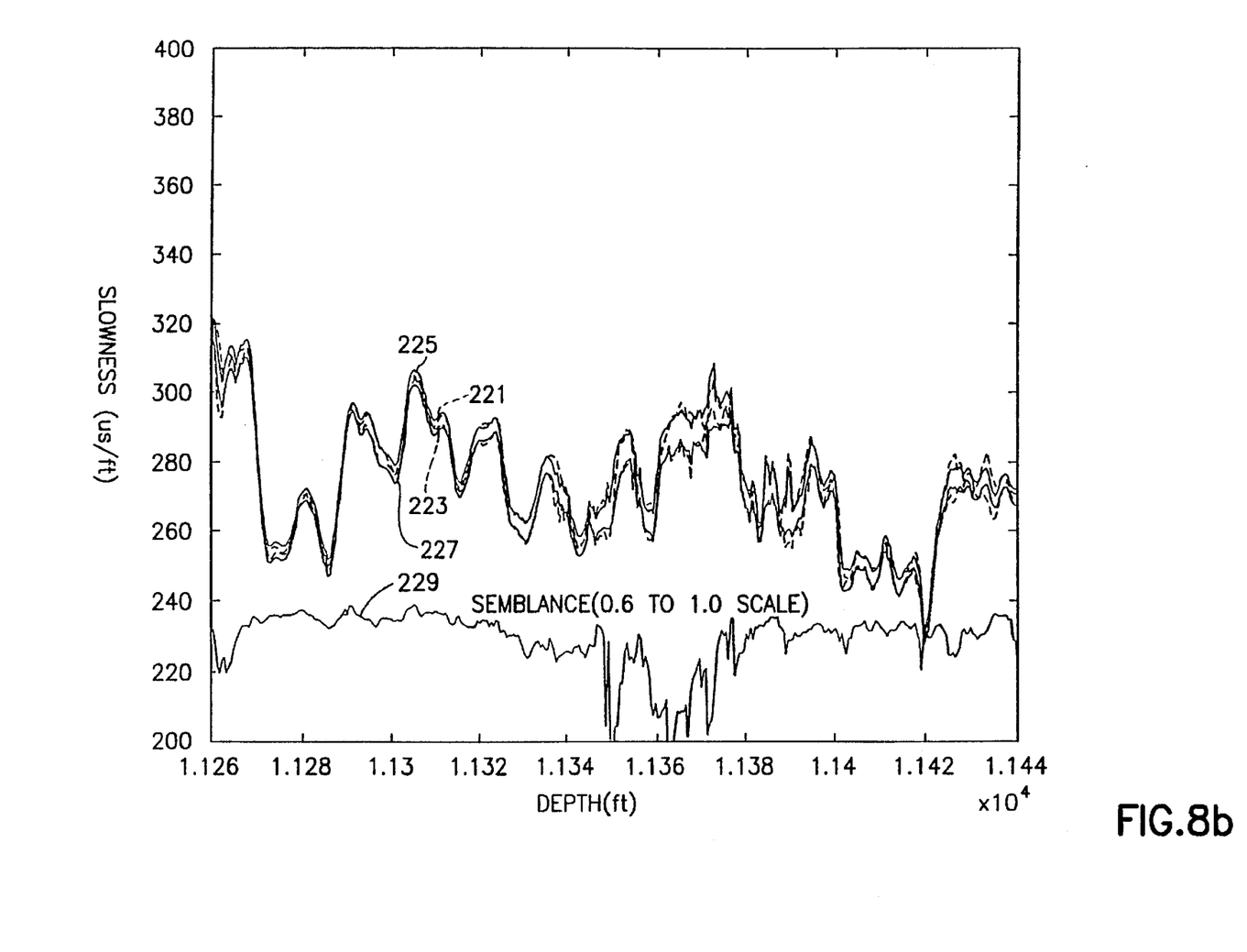

FIG. 8b depicts the estimate slownesses 221, 223, the error bars 225, 227, and the average semblances 229 for a one hundred eighty foot interval from a second well. The repeat run standard deviation $\sigma_R$ for the second well is 3.5 μs/ft (1.2%), while the average Cramer Rao standard deviation is 2.9 s/ft (1.1%), and the repeat bias difference $\mu_R$ is 0.3 μs/ft (0.1%).

There have been described and illustrated herein methods and apparatus for quantifying errors associated with the determination of values for formation parameters (e.g., formation slowness) via the use of sonic logging apparatus and methods. While particular embodiments of the invention have been described, it is not intended that the invention be limited exactly thereto, as it is intended that the invention be as broad in scope as the art will permit. Thus, while the invention has been described primarily with respect to the determination of error bars for a slowness determination, it will be appreciated that the method of generating error bars may be used in conjunction with the determination of my formation parameter of which a semblance can be calculated. Thus, for example, if a determination of permeability could be made from an analysis of sonic waveforms, and a semblance of the permeability determinations could be calculated, error bars for the permeability determination could be made. Also, it will be appreciated that the invention was described with reference to mathematical models which have certain underling assumptions. However, the invention can still be utilized with different models which might change the equations provided, but which do not change the underlying concepts taught herein. Further, while the invention was described with reference to an error bar log which constitutes lines which define a variance around an actual log determination (see FIGS. 8a and 8b), it will be appreciated that the error bar log might take the form of a line or lines, or bars which provide the variance of e.g., shear slowness in relation to the axis (i.e., a zero shear slowness). Therefore, it will be apparent to those skilled in the art that other changes and modifications may be made to the invention as described in the specification without departing from the spirit and scope of the invention as so claimed.

We claim:

1. A method for finding the variance of a determination of a parameter of a formation which is traversed by a borehole, comprising:

a) determining a semblance or normalized mean square error (NMSE) of the parameter by processing data which was obtained from a plurality of detectors (M) which detected acoustic waveforms, said acoustic waveforms being a function of noise and of a source signal which has interacted with the formation;

b) using said semblance or NMSE to find said variance for said parameter by relating said semblance or NMSE to a signal to noise ratio, using the signal to noise ratio to estimate a Cramer-Rao bound, where said Cramer-Rao bound is in turn related to said variance.

2. A method according to claim 1, further comprising:

c) plotting said variance.

3. A method according to claim 2, further comprising:

d) repeating said determining, said using, and said plotting for a plurality of locations along the borehole, to obtain a log of said variance of said parameter relative to locations in the formation.

4. A method according to claim 3, further comprising:

e) plotting a determination of values of said parameter as a function of the locations in the formation.

5. A method according to claim 4, wherein:

said log of said variance of said parameter is plotted relative to said values of said parameter for the locations in the formation.

6. A method according to claim 1, wherein:

said semblance or NMSE is related to said signal to noise ratio by a mean of the non-central beta distribution of said semblance equaling a function of said signal to noise ratio, the number M, and a time bandwidth product N.

7. A method according to claim 1, wherein:

said signal to noise ratio is $2E/N_0$, and said $2E/N_0$ is related to said Cramer-Rao bound by $$\frac{1}{\sigma_{CR}^2} = (2\pi)^2 K_{array} K_{signal} (2E/N_0),$$

where $K_{array}$ is a constant related to M and the spacing between the detectors, and $K_{signal}$ is a constant which is a function of the spectrum of the detected acoustic waveforms.

8. A method according to claim 6, wherein:

said signal to noise ratio is $2E/N_0$, and said $2E/N_0$ is related to said Cramer-Rao bound by $$\frac{1}{\sigma_{CR}^2} = (2\pi)^2 K_{array} K_{signal} (2E/N_0),$$

where $K_{array}$ is a constant related to M and the spacing between the detectors, and $K_{signal}$ is a constant which is a function of the spectrum of the detected acoustic waveforms.

9. A method according to claim 8, further comprising:

c) plotting said variance on a log; and d) repeating said determining, said using, and said plotting for a plurality of locations along the borehole, to obtain a log of said variance of said parameter relative to locations in said borehole.

10. A method according to claim 1, wherein:

said variance is taken as equal to said Cramer-Rao bound.

11. A method according to claim 1, wherein:

said parameter is the slowness of the formation.

12. A method according to claim 11, wherein:

said processing the data comprises backpropagating and stacking the data according to a slowness-time coherence algorithm.

13. A method for finding the variance of a determination of a parameter of a formation which is traversed by a borehole, comprising:

a) locating a borehole tool having an acoustic wave source and a plurality (M) of acoustic wave detectors in the borehole traversing the formation;

b) generating an acoustic signal with said acoustic wave source, and measuring resulting signals at the plurality of acoustic wave detectors, said resulting signals being a function of noise and of said acoustic signal;

c) processing said resulting signals in at most one moved-out window and without further partitioning of the resulting signals into windows of signal and noise to obtain said variance.

14. A method for finding the variance of a determination of a parameter of a formation which is traversed by a borehole, comprising:

a) locating a borehole tool having an acoustic wave source and a plurality (M) of acoustic wave detectors in the borehole traversing the formation;

b) generating an acoustic signal with said acoustic wave source, and measuring resulting signals at the plurality of acoustic wave detectors, said resulting signals being a function of noise and of said acoustic signal;

c) processing said resulting signals to obtain said variance, wherein said processing including determining a semblance or a normalized means square error (NMSE) of the parameter, and using said semblance or NMSE to find said variance for said parameter by relating said semblance or NMSE to a signal to noise ratio, using the signal to noise ratio to estimate a Cramer-Rao bound, where said Cramer-Rao bound is in turn related to said variance.

15. A method according to claim 14, wherein:

said semblance or NMSE is related to said signal to noise ratio by a mean of the non-central beta distribution of said semblance equaling a function of said signal to noise ratio, the number M, and a time bandwidth product N, and said signal to noise ratio is $2E/N_0$, and said $2E/N_0$ is related to said Cramer-Rao bound by $$\frac{1}{\sigma_{CR}^2} = (2\pi)^2 K_{array} K_{signal} (2E/N_0),$$

where $K_{array}$ is a constant related to M and the spacing between the detectors, and $K_{signal}$ is a constant which is a function of the spectrum of the detected acoustic waveforms.

16. A method according to claim 15, wherein:

said variance is taken as equal to said Cramer-Rao bound.

17. A method according to claim 14, further comprising:

d) plotting said variance; and e) repeating said locating, said generating, said processing, and said plotting for a plurality of locations along the borehole, to obtain a log of said variance of said parameter relative to locations in the formation.

18. A method according to claim 13, wherein:

said parameter is the slowness of the formation.

19. An apparatus for finding the variance of a determination of a parameter of a formation which is traversed by a borehole, comprising:

a) a borehole tool having an acoustic wave source means for generating an acoustic signal, and a plurality (M) of acoustic wave detector means for measuring resulting signals, said resulting signals being a function of noise and of said acoustic signal;

b) processing means for processing said resulting signals in at most one moved-out window and without further partitioning of the resulting signals into windows of signal and noise to obtain said variance.

20. An apparatus for finding the variance of a determination of a parameter of a formation which is traversed by a borehole, comprising:
   a) a borehole tool having an acoustic wave source means for generating an acoustic signal, and a plurality (M) of acoustic wave detector means for measuring resulting signals, said resulting signals being a function of noise and of said acoustic signal;
   b) processing means for processing said resulting signals to obtain said variance, wherein said processing means determines a semblance or a normalized means square error (NMSE) of the parameter, and uses said semblance or NMSE to find said variance for said parameter by relating said semblance or NMSE to a signal to noise ratio, and by using the signal to noise ratio to estimate a Cramer-Rao bound, where said Cramer-Rao bound is in turn related to said variance.

21. An apparatus according to claim 20, wherein:
said semblance or NMSE is related to said signal to noise ratio by a mean of the non-central beta distribution of said semblance equaling a function of said signal to noise ratio, the number M, and a time bandwidth product N, and
said signal to noise ratio is $2E/N_0$, and said $2E/N_0$ is related to said Cramer-Rao bound by $$\frac{1}{\sigma_{CR}^2} = (2\pi)^2 K_{array} K_{signal}(2E/N_0),$$

where $K_{array}$ is a constant related to M and the spacing between the detectors, and $K_{signal}$ is a constants which is a function of a tool which detected the acoustic waveforms.

22. An apparatus according to claim 21, wherein:
said variance is taken as equal to said Cramer-Rao bound.

23. An apparatus according to claim 19, further comprising:
   c) means for moving said borehole tool in the borehole; and
   d) means for plotting said variance on a log as a function of the location in the borehole.

24. An apparatus according to claim 23, wherein:
said parameter is the slowness of the formation.

25. A method according to claim 18, further comprising:
   d) repeating said locating, said generating, and said processing for a plurality of locations along the borehole;
   e) determining values for the slowness of the formation as a function of locations in the formation; and
   f) plotting said values for the slowness and said variance as logs relative to locations in the formation.

26. An apparatus according to claim 20, further comprising:
   c) means for moving said borehole tool in the borehole;
   d) means for determining the slowness of the formation, wherein said parameter is the slowness of the formation; and
   e) means for plotting the determined slowness of the formation and said variance as logs as a function of the location in the borehole.

* * * * *